R. T. BINDER.
STEERING WHEEL LOCK.
APPLICATION FILED JUNE 21, 1920.
1,390,953.
Patented Sept. 13, 1921.
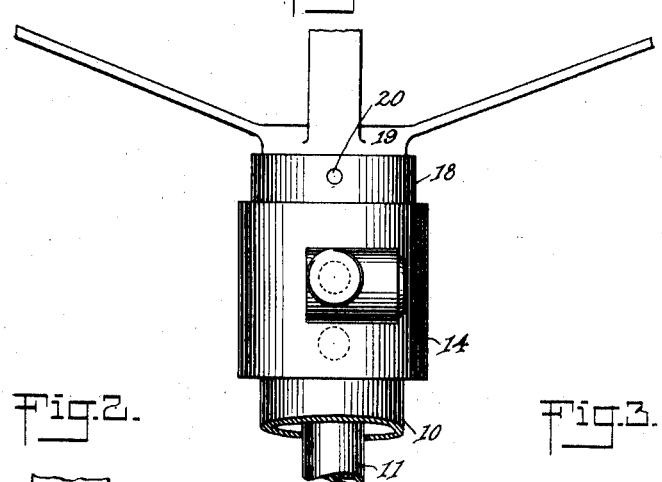
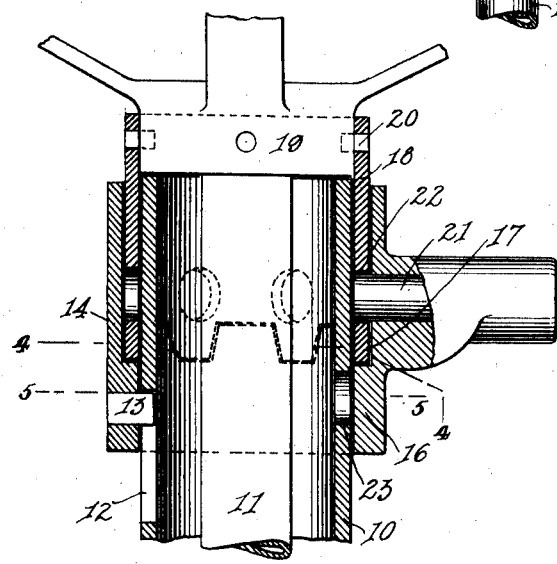
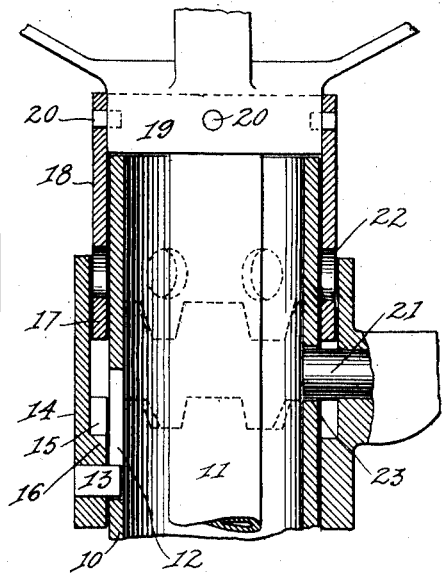
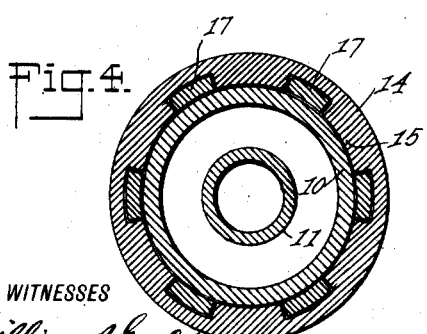
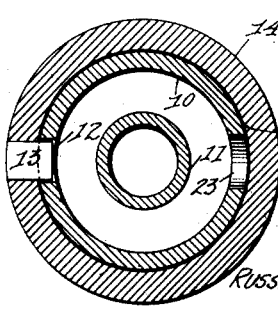
WITNESSES
INVENTOR
RUSSELL T. BINDER
BY
ATTORNEYS

UNITED STATES PATENT OFFICE.

RUSSELL T. BINDER, OF NEWARK, NEW JERSEY.

STEERING-WHEEL LOCK.

1,390,953.  Specification of Letters Patent.  Patented Sept. 13, 1921.

Application filed June 21, 1920. Serial No. 390,459.

*To all whom it may concern:*

Be it known that I, RUSSELL T. BINDER, a citizen of the United States, and a resident of Newark, in the county of Essex and State of New Jersey, have invented a new and Improved Steering-Wheel Lock, of which the following is a full, clear, and exact description.

My invention has for its object to provide a steering wheel lock with parts which have locking engagement with each other and which are concealed to prevent their mutilation.

Still other objects of the invention will appear in the following specification in which the preferred construction is set forth.

In the drawings the same reference characters refer to similar parts in all the views, and in which—

Figure 1 is a fragmentary sectional view illustrating my invention.

Fig. 2 is an enlarged sectional view showing the invention with the parts in locked position.

Fig. 3 is an enlarged sectional view similar to that shown in Fig. 2, but with the parts in unlocked position.

Fig. 4 is a sectional view on the line 4—4 of Fig. 2; and

Fig. 5 is a sectional view on the line 5—5 of Fig. 2.

By referring to the drawings it will be seen that the sleeve 10 in which the steering post 11 is disposed is provided with a slot 12 in which extends a pin 13, the pin 13 being mounted on a sleeve 14 having teeth 15 extending upwardly from a shoulder 16, said teeth 15 being provided for meshing with depending teeth 17 mounted on a sleeve 18 which is disposed between the sleeves 14 and 10. Inasmuch as the teeth 15 and 17 are at all times disposed within the sleeve 14 they will be concealed by the said sleeve so that the teeth may not be mutilated as a means of freeing the steering wheel, the hub 19 of which is secured to the sleeve 18 by the pins 20.

As best shown by Figs. 2 and 3 of the drawings a locking bolt 21 is mounted on the sleeve 14 for insertion in an opening 22 in the sleeve 18 to hold the teeth 15 and 17 in mesh, it being possible to withdraw this bolt 21 so that the sleeve 14 may be slipped downwardly relatively to the sleeves 18 and 10 which will make it possible to move the bolt 21 into the opening 23 in the sleeve 10 to lock the sleeve 14 with the teeth 15 free from the teeth 17.

The sleeve 10 is secured against rotation relatively to the vehicle. The pin 13 and slot 12 prevent the rotation of the sleeve 14 relatively to the sleeve 10, and when the teeth 15 and 17 are in mesh rotation of the sleeve 18 relatively to the sleeves 10 and 14 is prevented, thereby making it impossible to turn the steering wheel having the hub 19. However, as has been explained when the bolt 21 is withdrawn and the sleeve 14 is slipped downwardly, the steering wheel will then be operated in the usual manner.

I claim:

1. In a steering wheel lock, a sleeve normally secured against rotation relatively to a vehicle and provided with an opening, a second sleeve disposed around the first sleeve and spaced therefrom, the second sleeve having an inner shoulder with teeth, a third sleeve normally secured to a steering wheel and disposed between the first and second sleeves, the third sleeve having teeth for engaging the first teeth, and being provided with an opening, and a bolt carried by the second sleeve for disposal in the opening in the third sleeve when the teeth mesh and which may be disposed in the opening in the first sleeve when the teeth are out of mesh.

2. In a steering wheel lock, a sleeve normally secured against rotation relatively to a vehicle, a second sleeve of a larger inner diameter than the outer diameter of the first sleeve, the second sleeve having an inner shoulder engaging the first sleeve, the shoulder being provided with teeth, a third sleeve normally secured to a steering wheel disposed within the second sleeve and having teeth engaging the first mentioned teeth and locking means on the second sleeve for engaging the first or third sleeve at the will of the operator.

3. In a steering wheel lock, a sleeve having an opening, a second sleeve mounted on the first sleeve which locking means and having an opening, a third sleeve slidably mounted on the first two sleeves and having locking means for engaging the first locking means and a bolt independent of the locking means for disposal in either opening at the will of the operator and means to prevent the rotation of the third sleeve relatively to the first sleeve.

RUSSELL T. BINDER.